UNITED STATES PATENT OFFICE.

DAVID SPENCE AND ALEXANDER PATTISON CLARK, OF AKRON, OHIO, ASSIGNORS, BY MESNE ASSIGNMENTS, TO THE B. F. GOODRICH COMPANY, OF NEW YORK, N. Y., A CORPORATION OF NEW YORK.

PROCESS FOR THE PRODUCTION OF RUBBER-LIKE SUBSTANCES FROM ALCOHOLS.

1,161,904.     Specification of Letters Patent.     Patented Nov. 30, 1915.

No Drawing.     Application filed May 31, 1912. Serial No. 700,893.

*To all whom it may concern:*

Be it known that we, DAVID SPENCE and ALEXANDER PATTISON CLARK, citizens of the United States, residing at Akron, county of Summit, and State of Ohio, have invented a new and useful Process for the Production of Rubber-Like Substances from Alcohols, of which the following is a specification.

This invention relates to the production of rubber-like substances, and consists in the process of converting, by simple means, alcohols of certain types into substances having all of the characteristics of natural india rubber.

A well known method in organic chemistry for the production of unsaturated hydrocarbons and other substances consists in the dehydration of the corresponding alcohols, which dehydration can be effected in some instances without difficulty and is facilitated, as is also well known, by heat in the presence of suitable dehydrating agents. This method has actually been employed in order to prepare unsaturated derivatives of definite structure and with considerable success in some instances, it is claimed. The production, on the other hand, of rubber-like substances directly from alcohols has never been indicated or even suggested. We have made this important discovery, namely, that alcohols which yield by dehydration, hydrocarbons of the type

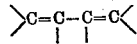

where the free valencies are saturated by hydrogen or by any hydrocarbon complex, can be directly converted by a very simple process into substances possessing all of the characteristics of natural india rubber, excellent yields of such rubber-like substances being obtained. Of alcohols which we have found may be employed in carrying out our process we desire in particular to call attention to the following types:—

(I) 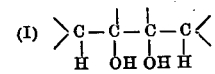

(II) 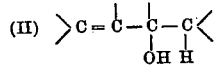

(III) 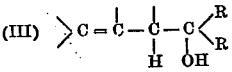

(IV) 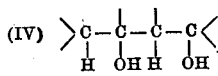

(V) 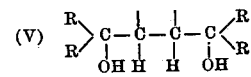

in which R denotes hydrogen or aryl hydrocarbon radicals and the remaining free valencies are saturated by hydrogen or by any hydrocarbon complex or partly by hydrogen and partly by hydrocarbon complexes.

We have found that when alcohols of the above types are heated alone to a suitable temperature, or, better, in the presence of dehydrating and polymerizing agents, they are converted into substances having the physical characteristics and valuable properties of india rubber. Alcohols of these types are readily prepared from acetone and other ketones, aldehydes and other organic substances by well known processes.

In order to more particularly describe the nature of our invention and how the same may be applied, we may cite the following examples:—

(I) 10 parts isopropenylmethylcarbinol of the formula

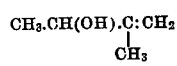

are mixed with 7 parts of glacial acetic acid and heated for 45 days in an autoclave at 150° C. The resulting mass is then subjected to steam distillation, whereby acetic acid with some unchanged isopropenylmethycarbinol and other substances are removed, and there is left a silver-like tough elastic product with all of the properties of natural india rubber.

(II) 10 parts of pinacone are mixed with 18 parts acetic anhydrid and heated 60 days in a closed vessel at 150° C. The mass soon becomes cloudy with separation of a viscous rubber-like substance. This rubber-like mass may be isolated as in example (I), or the entire mass is extracted with alcohol in which the rubber-like substance is insoluble.

(III) 10 parts of pinacone are mixed with ten parts of finely powdered anhydrous KHSO₄ with 0.5 parts acetic anhydrid and heated for 40 days in an autoclave at 100° C. The product may be isolated by solution in benzol, separating the benzol solution and precipitating the rubber-like substance therefrom with alcohol or acetone or with any other suitable precipitant, or the valuable product may be isolated by any other well known means.

(IV) 10 parts of the alcohol of the formula $$C_6H_5.CH:CH.C(OH)(CH_3)_2,$$

which is a heavy oil, readily prepared from benzylidene acetone and very unstable, losing water and polymerizing on distillation *in vacuo*, are mixed with 6 parts of formic acid (95%) and heated for 15 days in a closed vessel at 100° C. The mass thickens and finally becomes practically solid. The rubber-like substance produced may be separated by any of the methods given in the foregoing examples or the entire mass can be boiled out with water or alcohol, or a mixture of both, or said rubber-like substance can be isolated by any other convenient means. The product, like that resulting from the other examples given, possesses the characteristics and properties of natural india rubber.

The particulars set forth in the foregoing examples are merely illustrative of how our invention may be conveniently carried into effect and we do not limit ourselves thereto.

We have found that the temperature and pressure at which the reaction can be carried out may be varied within wide limits, and, therefore, do not limit ourselves to any specific temperature or range of temperature, or to any pressure, or to any time of treatment, the latter varying with the temperature and pressure. We may point out, indeed, that increase of temperature up to 150° C. accelerates the reaction, and that the higher alcohols are much more easily converted than the lower members, which are relatively more stable.

Furthermore, in carrying out our invention we have found that the transformation of these alcohols takes place when they are heated alone. The transformation proceeds relatively slowly, however, in the case of the lower members, but more rapidly in the case of the higher homologues. Where suitable substances are employed in conjunction with heat, the transformation is intensified. We have discovered, further, that a very great number of substances or a mixture of these substances may be conveniently employed to hasten the transformation of these alcohols into rubber-like substances, and while we refrain from enumerating all these substances or mixtures thereof, we wish it to be understood that we do not limit our invention in this connection. Similarly the proportion of these agents used to facilitate this reaction may be varied within wide limits according to the nature of the reagent and the alcohol to be treated so that it is impossible to describe any one case which will be applicable to all alcohols alike. Acetic anhydrid we have found to be particularly advantageous in promoting this transformation. The action of these substances in promoting the transformation is largely catalytic, involving dehydration of these alcohols in the first place and the polymerization of the resulting unsaturated hydrocarbons in the second. It is furthermore possible to replace these alcohols by mixtures of the same and to work in solution in any convenient solvent.

Having thus fully described our invention, what we claim as new and desire to secure by Letters Patent of the United States, is:

1. A process for the direct production of rubber-like substances, which consists in heating, in the presence of a suitable dehydrating agent, an alcoholic body of a type which, by loss of water, yields a hydrocarbon of the type

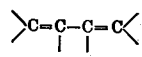

wherein the free valencies may be saturated by hydrogen or an equivalent, the heating taking place at a suitably-high temperature, and being prolonged until the rubber-like substance appears, without isolation of the intermediate hydrocarbon.

2. A process for the direct production of rubber-like substances which consists in heating an alcohol of the type

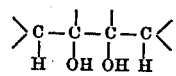

wherein the free valencies may be saturated by hydrogen or an equivalent, the heating taking place at a suitably-high temperature and being prolonged sufficiently to produce the rubber-like substance directly from the alcohol.

3. The herein-described process which consists in heating pinacone for such a prolonged time and at such temperature that, without isolating the intermediate hydrocarbon, the final rubber-like substance is obtained.

4. The herein-described process which consists in heating pinacone in the presence of a dehydrating agent, the heating being conducted at such temperature and being so prolonged as directly to yield a rubber-like substance without isolating the intermediate hydrocarbon.

5. The herein-described process which consists in the prolonged heating, together with acetic anhydrid, of an alcoholic body of the kind which, by loss of water, yields hydrocarbons of the type

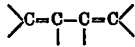

wherein the free valencies may be saturated by hydrogen or an equivalent, thereby directly dehydrating and polymerizing the alcohol to a rubber-like substance.

6. A process for the direct production of rubber-like substances, which consists in heating for several days, at a temperature approximating 100° to 150° C., together with acetic anhydrid, an alcohol of the type

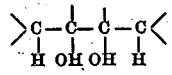

in which part of the free valencies are saturated by a monovalent radical and the remaining ones by hydrogen or an equivalent, without isolation of intermediately-formed substances.

In testimony whereof, we affix our signatures in the presence of two witnesses.

DAVID SPENCE.
ALEXANDER PATTISON CLARK.

Witnesses:
C. W. McLaughlin,
J. W. Jordan.